US008866014B2

(12) United States Patent
Wentzel et al.

(10) Patent No.: US 8,866,014 B2
(45) Date of Patent: Oct. 21, 2014

(54) DEAD FRONT CABLE TERMINAL WITH ISOLATED SHIELD

(75) Inventors: Carl J. Wentzel, Austin, TX (US);
William L. Taylor, Round Rock, TX (US); Brian C. Inberg, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 197 days.

(21) Appl. No.: 13/473,996

(22) Filed: May 17, 2012

(65) Prior Publication Data

US 2013/0306345 A1 Nov. 21, 2013

(51) Int. Cl.

| *H01R 4/00* | (2006.01) |
| *H02G 15/02* | (2006.01) |
| *H01R 4/18* | (2006.01) |
| *H01R 43/04* | (2006.01) |
| *H01R 43/20* | (2006.01) |
| *H01R 4/64* | (2006.01) |
| *H01R 13/53* | (2006.01) |

(52) U.S. Cl.
CPC ............... *H01R 4/646* (2013.01); *H01R 13/53* (2013.01)
USPC ........................................................... 174/93

(58) Field of Classification Search
CPC . H02G 15/013; H02G 15/192; H02G 15/117; H02G 15/18; H02G 15/10; H02G 15/184; H02G 15/02; H02G 15/103; H02G 15/08; H01R 13/53; H01R 4/646; H01R 4/726; H01R 43/20; H01R 24/28
USPC .......... 174/93, 84 R; 439/181–187, 521, 921, 439/934, 932, 626; 29/747
See application file for complete search history.

(56) References Cited

U.S. PATENT DOCUMENTS

| 4,714,438 | A | * | 12/1987 | Williams ................. 439/607.51 |
| 4,738,318 | A | | 4/1988 | Boettcher |
| 7,104,822 | B2 | * | 9/2006 | Jazowski et al. .............. 439/181 |
| 2010/0261383 | A1 | | 10/2010 | Su |
| 2010/0279543 | A1 | | 11/2010 | Nguyen |

FOREIGN PATENT DOCUMENTS

DE 44 32 542 * 10/1997

OTHER PUBLICATIONS

"Single-Point Grounding: How Far Can You Go?", Southwire Power Cable Representatives newsletter, reprinted from May 1995 Power Cable Update.
"3M Cold Shrink T-Body Equipment Connection Kit 7706-35TC-XB Series for JCN cable used in Cross-Bond Applications", Product Literature, 3M Company, Sep. 2011.
"3M Cold Shrink T-Body Equipment Connection Kit", Product Literature, 3M Company, Jan. 2011.
High Voltage XLPE Cable Systems, Technical User Guide, Brugg Cables, p. 7-12.
International Search report for counterpart PCT application No. PCT/US2012/038274, mailed Jul. 17, 2012.

* cited by examiner

*Primary Examiner* — Javaid Nasri
(74) *Attorney, Agent, or Firm* — Gregg H. Rosenblatt

(57) ABSTRACT

Provided is a dead front cable terminal comprising a cable assembly and connector device in which the cable insulation shield and cable metallic ground of the cable assembly are electrically isolated from the portion of the outer semi-conductive layer of the connecting device that forms part of a chamber in which at least a portion of the cable assembly is located. The terminal is suitable for cross bonding.

20 Claims, 9 Drawing Sheets

DEAD FRONT CABLE TERMINAL WITH ISOLATED SHIELD

TECHNICAL FIELD

This invention relates to a dead front cable terminal having an isolated shield. The terminal is suitable for cross bonding.

BACKGROUND

A dead front cable termination system typically includes a cable terminated with a metallic lug (i.e., cable connector), the cable connector and end portion of the cable being inserted into the housing of a connecting device, the cable connector being connected to a mating device within the confines of the housing. The housing needs to form a tight seal around the end portion of the cable to prevent contamination or corrosion of the connection.

Long distribution underground cable circuits such as those used in wind farm power collection systems are subject to charge build up in the cable metallic shield layer on the cables. The charge build up can become so substantial that the cable has to be de-rated (i.e., operated at less than optimum) due to the heat generated by the ground current through the metallic shield layer. Heat is a contributing factor in cable degradation.

SUMMARY

At least one embodiment of the present invention seeks to address the issue of charge build up by employing dead front terminal connectors that can be cross bonded.

At least one embodiment of the present invention provides an article suitable for cross bonding or shield isolation comprising a first dead front terminal comprising a first connecting device comprising a first housing having an outer semi-conductive layer and a first chamber defined by at least one wall wherein the outer semi-conductive layer comprises a portion of at least one wall of the first chamber, a first cable assembly having an exposed cable insulation shield layer and an exposed cable metallic ground layer, at least a portion of the first cable assembly positioned within the first chamber of the first connecting device, wherein the cable insulation shield layer and the cable metallic ground layer are electrically insulated from the outer semi-conductive layer of the connecting device, and wherein the cable metallic ground layer is electrically connected to a first external conductor. One or both of the cable insulation shield and the cable metallic ground may be located in the first chamber of the connecting device housing.

At least one embodiment of the present invention provides a system comprising: nine sections of cable, each having first and second ends, a first, a second, and a third cable section each having a second end comprising a cable assembly; a fourth, a fifth, and a sixth cable section each having first and second ends comprising a cable assembly; and a seventh, an eighth, and a ninth cable section each having a first end comprising a cable assembly; twelve connecting devices each comprising a first housing having an outer semi-conductive layer and a first chamber defined by at least one wall wherein the outer semi-conductive layer comprises a portion of at least one wall of the first chamber; at least a portion of each cable assembly residing in a first chamber of a housing of a connecting device, each cable assembly having an exposed cable insulation shield layer and cable metallic ground layer, each cable insulation shield layer and cable metallic ground layer being electrically insulated from the outer semi-conductor layer of the connecting device; wherein the cable metallic ground layer on the second end of the first cable section is electrically connected to the cable metallic ground layer on the first end of the fourth cable section; the cable metallic ground layer on the second end of the second cable section is electrically connected to the cable metallic ground layer on the first end of the fifth cable section; the cable metallic ground layer on the second end of the third cable section is electrically connected to the cable metallic ground layer on the first end of the sixth cable section; the cable metallic ground layer on the second end of the fourth cable section is electrically connected to the cable metallic ground layer on the first end of the seventh cable section; the cable metallic ground layer on the second end of the fifth cable section is electrically connected to the cable metallic ground layer on the first end of the eighth cable section; the cable metallic ground layer on the second end of the sixth cable section is electrically connected to the cable metallic ground layer on the first end of the ninth cable section; wherein the first, fourth, and seventh cable sections are in different voltage phases of a three-phase power system, the second, fifth, and eighth cable sections are in different voltage phases of a three-phase power system, and the third, sixth, and ninth cable section are in different voltage phases of a three-phase power system.

At least one embodiment of the present invention provides a kit for installing a dead front cable terminal suitable for cross bonding or shield isolation on a cable assembly having an exposed cable shield layer and cable metallic ground layer, the kit comprising:

a connecting device comprising a housing having an outer semi-conductive layer and a first chamber defined by at least one wall wherein the outer semi-conductive layer comprises a portion of at least one wall of the first chamber; and a device for electrically insulating one or both of the cable insulation shield and the cable metallic ground layer of the cable assembly from the outer semi-conductor layer of the connecting device.

At least one embodiment of the present invention provides an article suitable for cross bonding comprising: a first dead front terminal comprising a housing having a first chamber wherein the walls of the first chamber comprise at least one semi-conductive layer, a first cable assembly having a cable insulation shield layer and the cable metallic ground layer in the first chamber of the housing, wherein the cable insulation shield layer and the cable metallic ground layer are exposed, and wherein the cable insulation shield layer and the cable metallic ground layer are electrically insulated from the at least one semi-conductor layer of the dead front terminal and are electrically connected to a first external conductor that extends outside of the housing.

The above summary of the present invention is not intended to describe each disclosed embodiment or every implementation of the present invention. The Figures and detailed description that follow below more particularly exemplify illustrative embodiments.

DETAILED DESCRIPTION

In the following detailed description of the preferred embodiments, reference is made to the accompanying drawings that form a part hereof. The accompanying drawings show, by way of illustration, specific embodiments in which the invention may be practiced. It is to be understood that other embodiments may be used, and structural or logical changes may be made without departing from the scope of the present invention. The following detailed description, therefore, is not to be taken in a limiting sense, and the scope of the invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

In addition, directional terminology, such as "top," "bottom," "front," "back," "above," "below," etc., is used with reference to the orientation of the Figure(s) being described. Because components of embodiments can be positioned in a number of different orientations, the directional terminology is used for purposes of illustration and is in no way limiting. In general similar reference numbers are used for similar features in the various embodiments. Unless indicated otherwise, these similar features may comprise the same materials, have the same attributes, and serve the same or similar functions. Additional or optional features described for one embodiment may also be additional or optional features for other embodiments, even if not explicitly stated, where appropriate.

Figure 1:
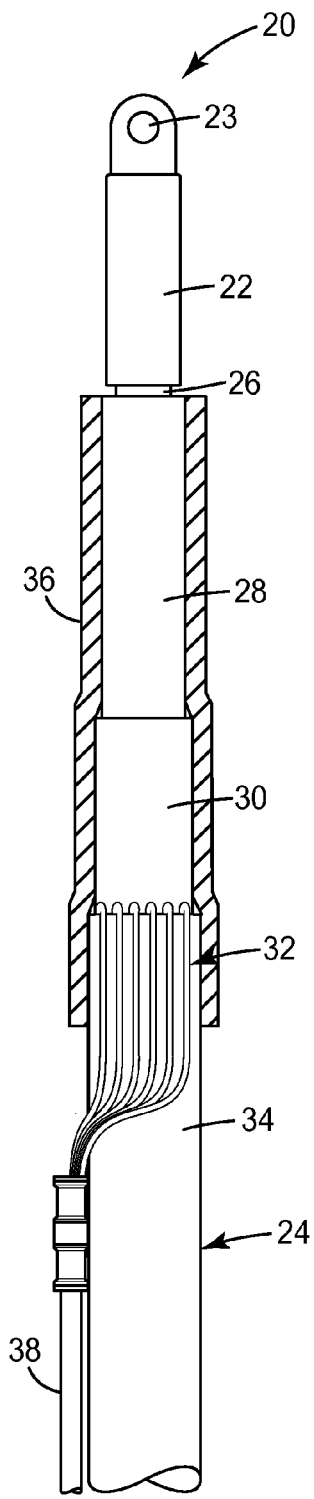
FIG. 1 depicts a partial cross-section of an example of a cable assembly of at least one embodiment of the present invention.

FIG. 1 shows a power cable assembly 20 of the present invention which includes cable connector 22 (having aperture 23) attached to a cable 24. Cable 24 includes cable conductor 26 concentrically surrounded by cable insulation 28, cable insulation shield 30 (typically a conductive polymer), cable metallic ground 32 (which are shown as conductive wires, but may also be equally suitable materials such as conductive tape or solid metal conductors), and cable jacket 34. To form cable assembly 20, each of the cable insulation 28, cable insulation shield 30, cable metallic ground 32, and cable jacket 34 are stripped back from an end of cable 24 to expose a portion of the underlying layer, down to cable conductor 26. Cable connector 22 is then attached to the exposed portion of cable conductor 26 by any suitable means, typically by crimping. In the embodiment of FIG. 1, cable metallic ground layer 32 comprises metal wires that are folded back, gathered, and attached to a small connector, which in turn is attached to an external conductor 38 (a separate cable). In the embodiment of FIG. 1, insulating sleeve 36 is applied to cable assembly 20 to insulate cable insulation shield 30 and cable metallic ground 32 from the outer semi-conductor layer of a connecting device 100 (shown in FIG. 2) when cable assembly 20 is inserted into connecting device 100. In the embodiment of FIG. 1, insulating sleeve 36 extends from the top of cable insulation layer 28 to, and over, a portion of cable jacket 34. External conductor 38, and, optionally, portions of the wires of cable metallic ground 32 extend beyond the edge of insulating sleeve 36.

Insulating sleeve 36 may be made from any suitable material. It may comprise elastomeric material and may further be a cold-shrink sleeve. If it is a cold shrink sleeve, it may be made from any material suitable for cold-shrink applications. Most suitable are materials such as highly elastic rubber materials that have low permanent sets, such as ethylene propylene diene monomer (EPDM), elastomeric silicone, or hybrids thereof. Any suitable device that can electrically insulate cable assembly 20 from the semi-conductive layers of connecting device 100 may be used in place of insulating sleeve 36.

Figure 2:
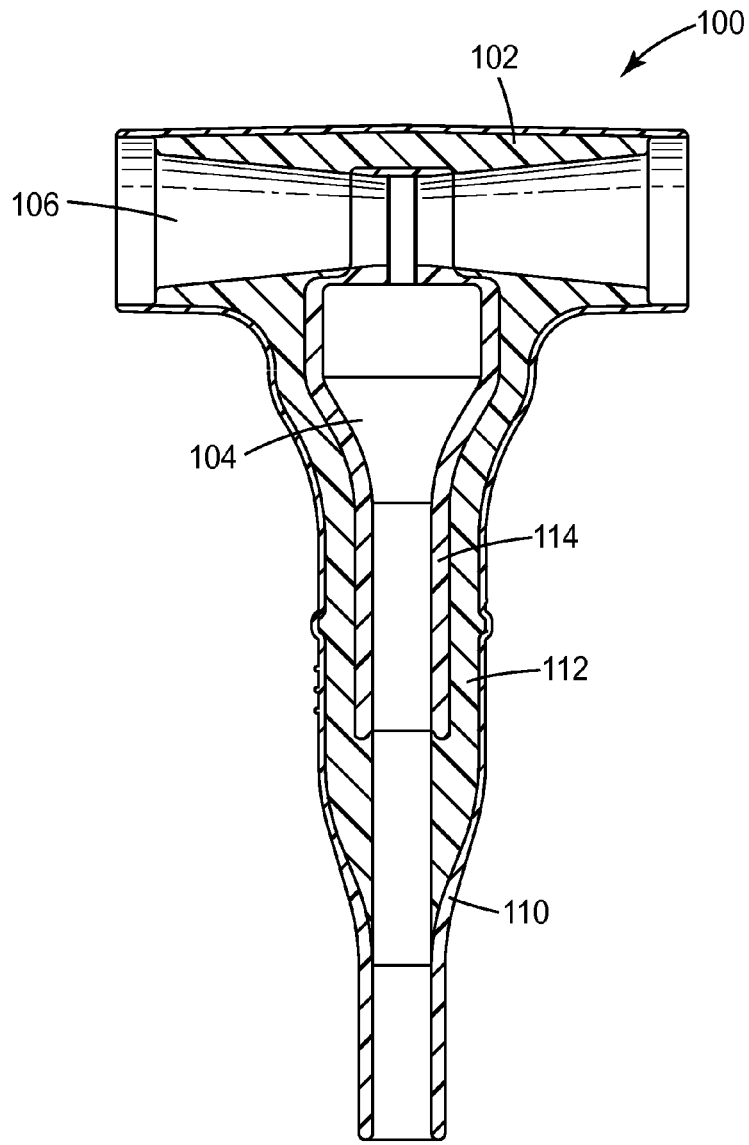
FIG. 2 depicts a cross-section of a connecting device of at least one embodiment of the present invention.

The connecting device of the present invention may be any connector that is suited for use in a dead front terminal, that can accommodate a cable assembly with an isolated shield, and that is suitable for cross bonding as described herein. FIG. 2 shows connecting device 100 which includes housing 102 that generally defines first chamber 104 and second chamber 106. First chamber 104 and second chamber 106 intersect such that the interior of first chamber 104 is in communication with the interior of second chamber 106. First and second chambers 104, 106 may intersect to form a general T-shape as shown in FIG. 2 or a general L-shape (not shown). Housing 102 further includes an outer semi-conductive layer 110, an intermediate insulating layer 112, and an inner semi-conductive layer 114. A portion of each of these layers partially forms the interior wall of first chamber 104.

Housing 102 may be made from any material suitable for cold-shrink applications. Most suitable are materials such as highly elastic rubber materials that have a low permanent set, such as ethylene propylene diene monomer (EPDM), elastomeric silicone, or hybrids thereof. The semi-conductive and insulating materials may be made of the same or different types of materials. The semi-conductive and insulating materials may have differing degrees of conductivity and insulation based on the inherent properties of the materials used or based on additives added to the materials.

Figure 3:
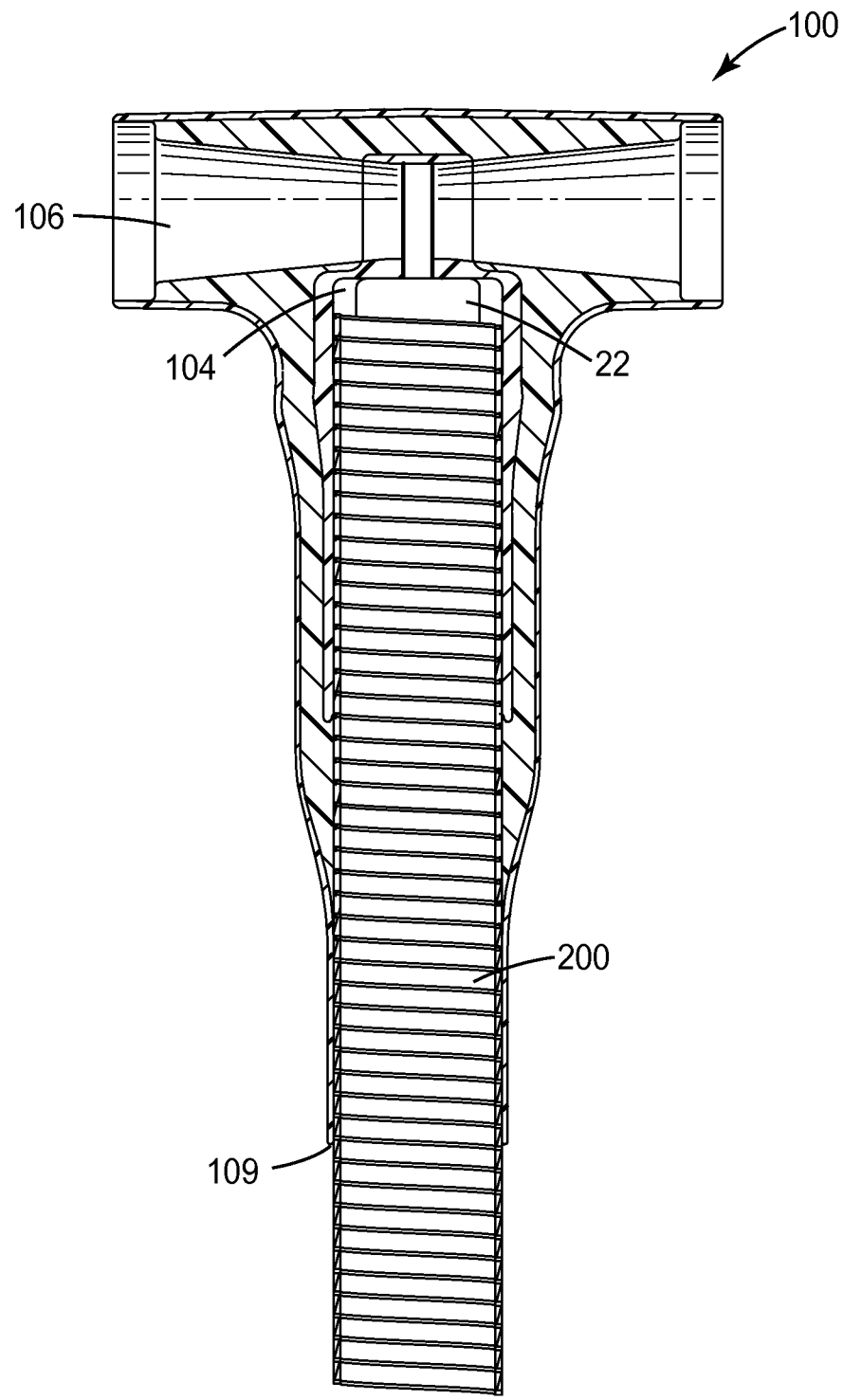
FIG. 3 depicts a partial cross-section of a connecting device of at least one embodiment of the present invention with a removable support core loaded in the connecting device.

To enable cable assembly 20 to be inserted into first chamber 104 of connecting device 100, a removable support core 200 may be first loaded into first chamber 104, as illustrated in FIG. 3. Once loaded, removable support core 200 typically extends from the end of the upper portion of first chamber 104 nearest second chamber 106 to beyond open end 109 of first chamber 104 through which cable assembly 20 is inserted. When loaded into first chamber 104, removable support core 200 radially expands first chamber 104 to an inner diameter greater than the outer diameter of the largest portion of cable assembly 20 that will be inserted into first chamber 104.

Removable support core 200 may be made of any suitable material and in any suitable configuration, but typically consists of an extruded nylon or propylene ribbon that is helically wound. Removable support core 200 may be removed from first chamber 104 by being unraveled. It is unraveled by pulling on a tab (not shown) extending from one end of the removable support core 200 and causing separation of the core along a helical score line or joint. Preferably, removable support core 200 is unraveled starting with the end in the upper portion of first chamber 104 nearest the second chamber 106 and ending with the end that extends beyond the open end 109 of first chamber 104. Unraveling removable support core 200 in this manner prevents the open end 109 of first chamber 104 from prematurely collapsing and obstructing the removal of removable support core 200.

Once the removable support core has been loaded into the first chamber 104, cable assembly 20 may be inserted into first chamber 104. Typically, cable connector 22 will include an aperture 23 at its free end. The free end is positioned in the intersection of the first and second chambers, 104, 106 with the remainder of the cable connector residing in first chamber 104. Once the cable assembly is correctly positioned, a mating device is inserted and holds the cable in place. Removable support core 200 may then be removed as described above to cause first chamber 104 to contract and form a tight seal around cable assembly 20.

Figure 4A:
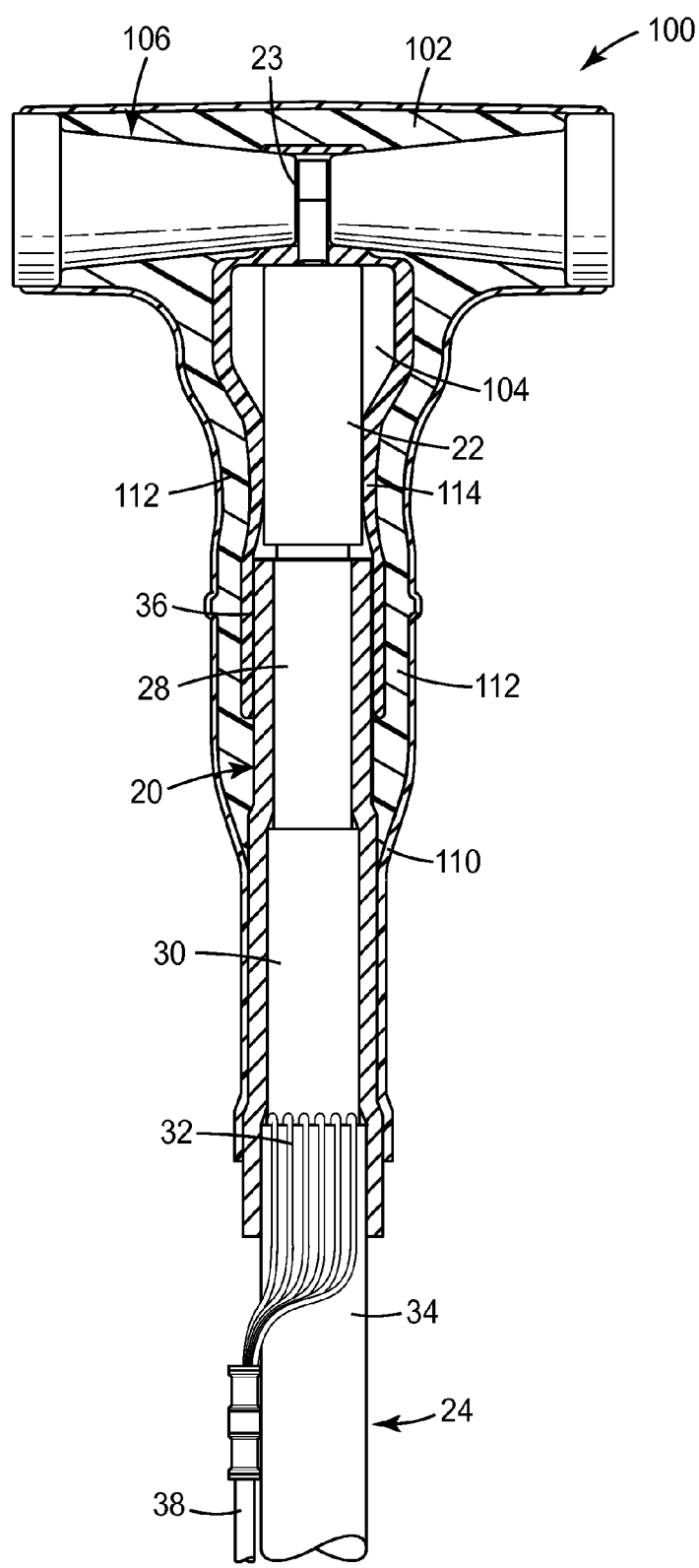
FIGS. 4A-4C depict partial cross-sections of embodiments of dead front terminals of the present invention.

In the embodiment of FIG. 4A, when the dead front terminal is assembled, the portion of inner semi-conducting layer 114 comprising the interior wall of the first chamber 104 of the housing 102 makes intimate contact with the cable connector 22 of cable assembly 20. A second portion of the interior wall of first chamber 104 comprises intermediate insulating layer 112 and a third portion of the interior wall of first chamber 104 comprises outer semi-conducting layer 110. To accomplish shield isolation and cross bonding, the third portion of the inner wall is prevented from making electrical contact with cable insulation shield 30 and with cable metallic ground layer 32. In the embodiment of FIG. 4A, this electrical contact is prevented by insulating sleeve 36. The portion of the interior wall of first chamber 104 comprising outer semi-conducting layer 110 preferably makes intimate contact with a portion of insulating sleeve 36 to prevent contaminants and/or moisture from entering the first chamber 104. An external conductor 38 is electrically connected to cable metallic ground layer 32 so cable metallic ground layer 32, can be cross bonded to the cable metallic ground layer 32 of another cable in a second dead front terminal.

To create the device of FIG. 4A, the layers of cable 24 are first removed generally as shown in FIG. 1 (and FIG. 4A) so that a portion of each layer is exposed. The wires of the cable metallic ground layer 32 are pulled back and connected to the external conductor 38 with, e.g., a crimp connector. Then insulating sleeve 36 is placed over the exposed portions of the cable (except the cable conductor layer 26). In this embodiment, the insulating sleeve 36 extends from the end of the cable insulation 28 adjacent the conductor 26 all the way to the cable jacket 34. It covers a portion of the cable jacket, metallic ground layer 32, and cable shield 30 to insulate the cable shield 30 and cable metallic ground 32 from outer semi-conductive layer 110 of connecting device 100.

Figure 4B:
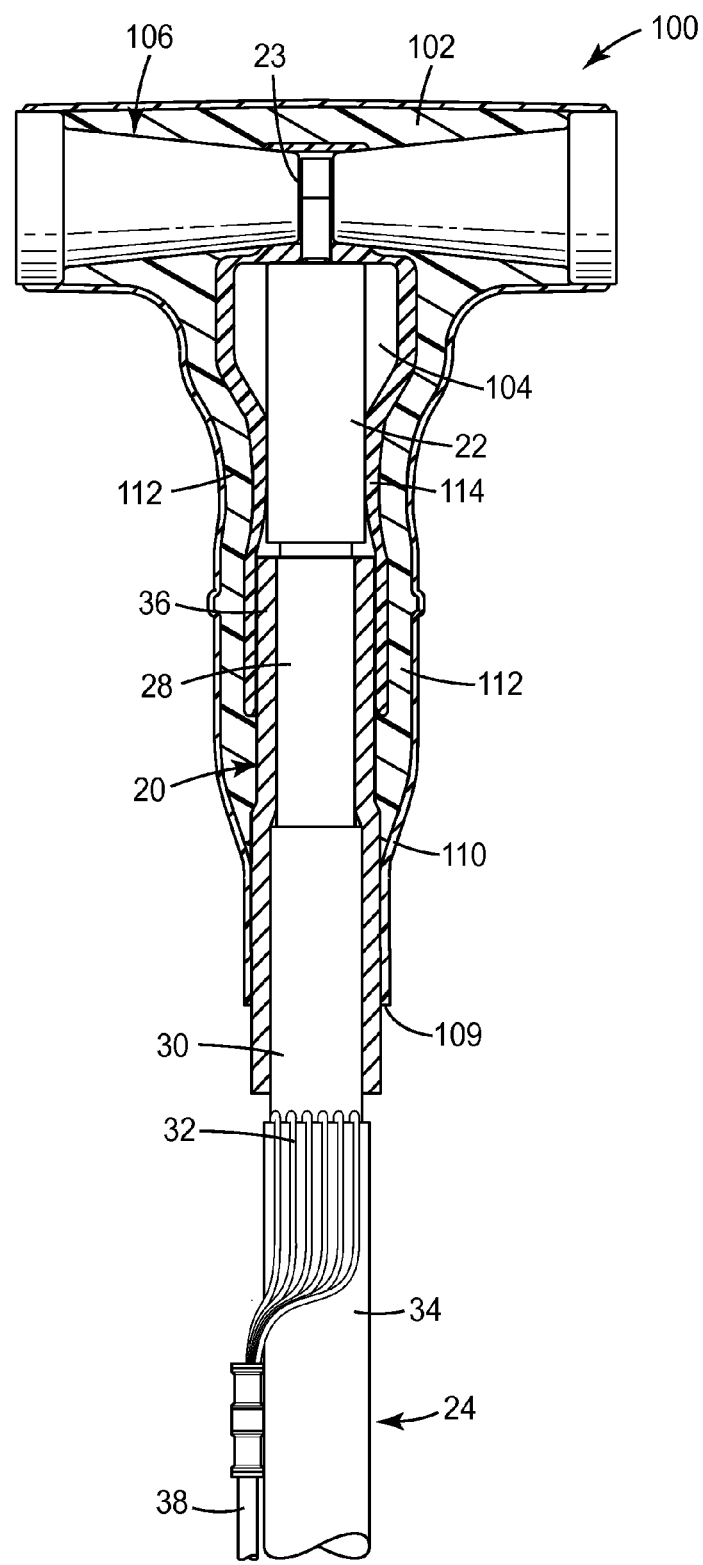

FIG. 4B shows an alternate embodiment of a dead front terminal of the present invention. In the embodiment of FIG. 4B, open end 109 of first chamber 104, which is formed by outer semi-conductive layer 110, is located adjacent cable insulation shield 30 of cable 24 when the dead front terminal is assembled. Insulating sleeve 36 is configured to extend beyond open end 109 of first chamber 104 such that it covers more of cable insulation shield layer 30 than does semi-conductive layer 110, but is configured such that it does not cover cable metallic ground layer 32 or cable jacket 34. Cable metallic ground layer 32 may subsequently be covered by a protective layer, such as tape or an elastomeric sleeve, to prevent contact with contaminants and/or moisture.

Figure 4C:
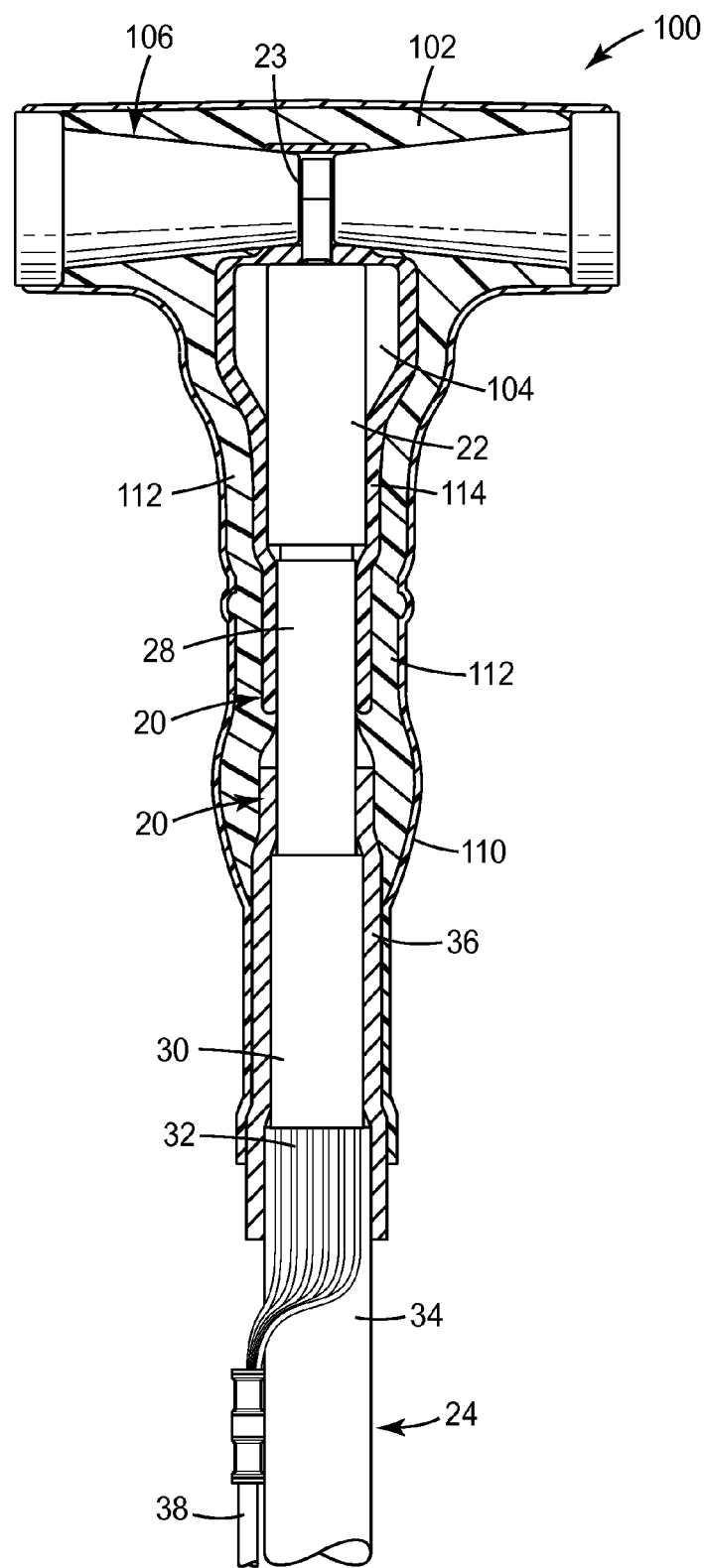

FIG. 4C shows yet another alternate embodiment of a dead front terminal of the present invention. The embodiment of 4C is similar to that of 4A except that insulating sleeve 36 does not extend from the top of cable insulation layer 28 to, and over, a portion of cable jacket 34. Instead, it extends from an intermediate portion of cable insulation layer 28 to and over, a portion of cable jacket 34.

As can be seen from the embodiments of FIGS. 4A-4C, the means by which cable insulation shield 30 and cable metallic ground 32 are electrically insulated from the portion of first chamber 104 comprising outer semi-conductive layer 110 can be any suitable means such as, e.g., tape, mastic, a rigid tube, a crushable tube, a flexible tube, physical distance, etc. Cable insulation shield 30 and cable metallic ground 32 may be insulated by the same or different insulating means, which means may comprise one or more parts or sections. Any suitable combination of insulating means may be used so long as both cable insulation shield 30 and cable metallic ground layer 32 are adequately electrically insulated from outer semi-conductive layer 110.

Figure 5:
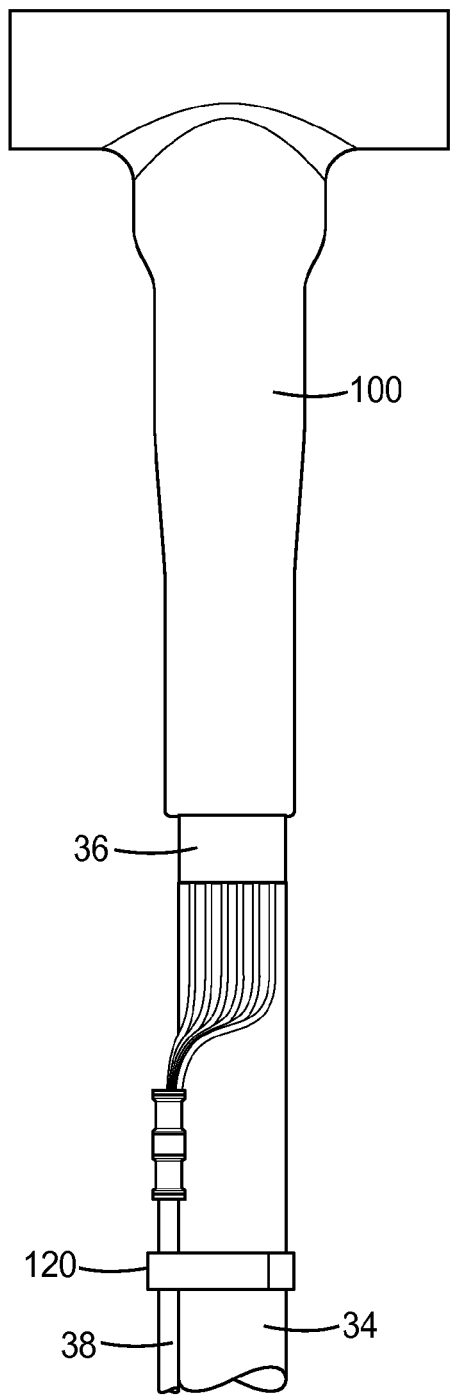
FIGS. 5 to 8 depict steps in a process of preparing a dead front terminal according to at least one embodiment of the present invention.
Figure 6:
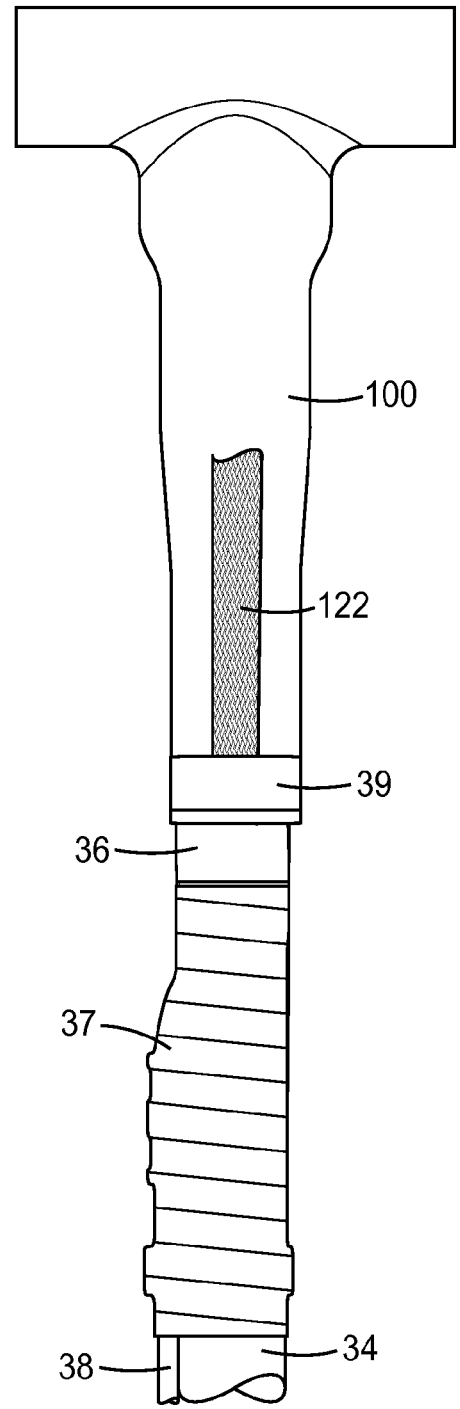
Figure 7:
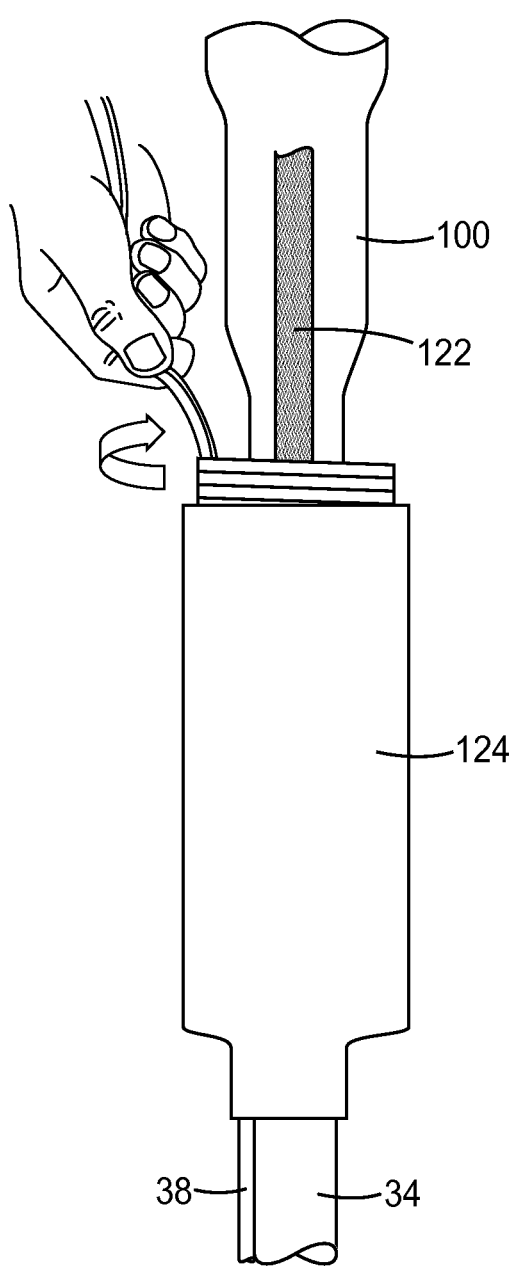
Figure 8:
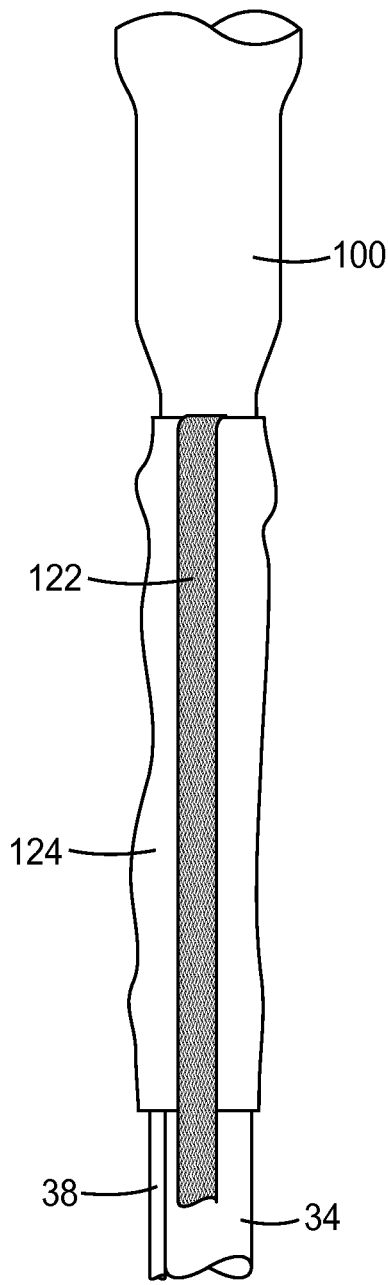

FIGS. 5 to 8 show a more detailed process by which a dead front terminal of the present invention is prepared for cross bonding. FIG. 5 shows the connecting device 100 installed on the cable assembly 20 with an optional mastic ring 120 to create an environmental seal once the optional environmental sealing tube (FIG. 7) is applied. FIG. 6 shows external cable 38 covered by an optional layer of tape 37 and a ground wire 122 being attached to the outer semi-conductive layer 110 of the connecting device 100 by tape 39. FIG. 7 shows the application of an optional environmental sealing tube 124, which is a cold shrink tube in this case. The optional environmental sealing tube 124 covers a portion of connecting device 100, the previously exposed portion of insulating sleeve 36, part of external connector 38, and part of cable jacket 34. FIG. 8 shows the fully prepared terminal. External conductor 38 extends from the lower end of environmental sealing tube 124 and ground wire 122 extends from the upper end (closest to cable connector 22) of environmental sealing tube 124.

Prior to the present invention, only cross bonding of splices was known. Typically, splice cross bonding is done with three equal length sections of cable having cable metallic ground layers in different voltage phases wherein the cable sections are interrupted at one or more points by a splice connector. When cross bonding is done with splices, it typically consists of connecting the metallic ground layer of a cable coming into one splice connector to the metallic ground layer of a cable exiting a different splice connector wherein the metallic ground layers are in different voltage phases. This is illustrated in more detail in FIG. 9 in which the metallic ground layer on the first section (to the left of each splice) of cable A is connected to the metallic ground layer on the second section (to the right of each splice) of cable B; the cable metallic ground layer on the first section of cable B is connected to the cable metallic ground layer on the second section of cable C; and the cable metallic ground layer on the first section of cable C is connected to the cable metallic ground layer on the second section of cable A.

Figure 9:
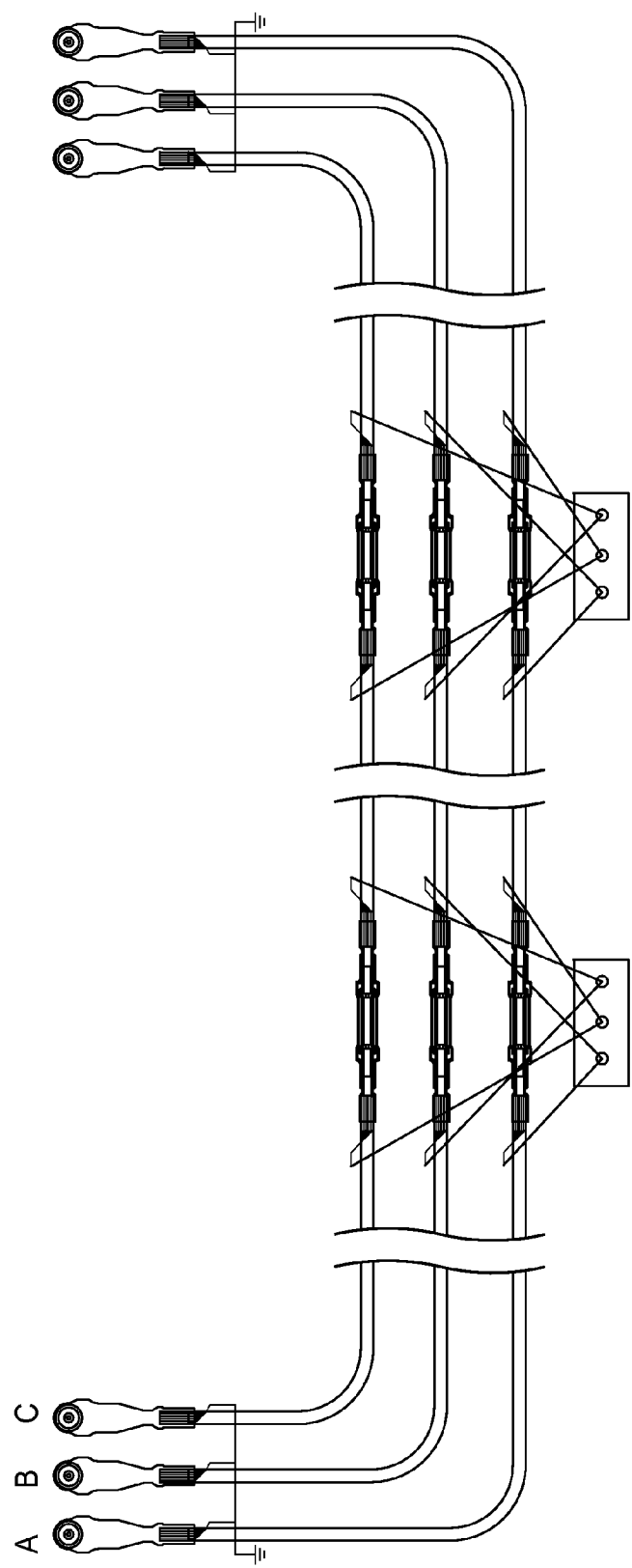
FIG. 9 depicts prior art cross bonded splices.

FIG. 9 illustrates two sets of cross bonded splices installed along the entire cable length in order to create three equal smaller lengths of cables that are required to complete the phase shift canceling of the ground currents in the cable metallic ground layers along the entire length of cable. These two sets of splices are installed to create 3 equal lengths of cable so that the magnitude of the ground currents created in each section are equal which allows for phase cancelling when the metallic ground layers of the cables are cross bonded.

Figure 10:
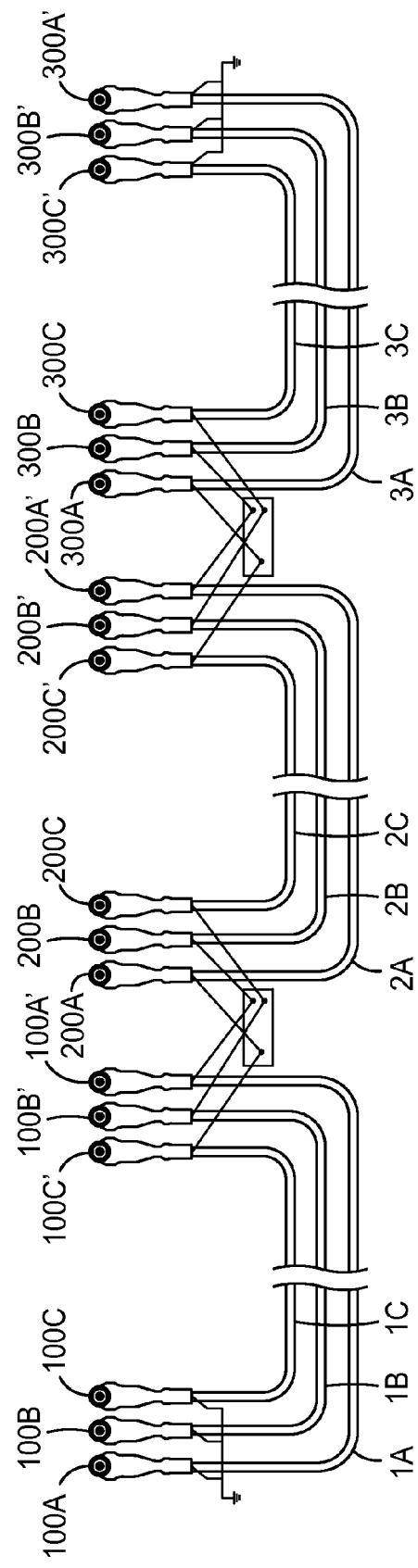
FIG. 10 depicts a system of cross bonded dead front terminals according to at least one embodiment of the present invention.

Instead of cable splice connectors, the present invention relates to cross bonding dead front cable terminals. For example, as shown in FIG. 10, nine sections of cable are provided, 1A, 1B, 1C, 2A, 2B, 2C, 3A, 3B, and 3C. Each cable section is terminated at both ends by a connecting device. For example, cable 1A is terminated by connecting devices 100A and 100A', cable 2A is terminated by connecting devices 200A and 200A'. At a first junction box, the cable metallic ground layer of cable 1A, which is terminated at one end by connecting device 100A', is connected to the cable metallic ground layer of cable 2B, which is terminated at one end by connecting device 200B; the cable metallic ground layer of cable 1B, which is terminated at one end by connecting device 100B', is connected to the cable metallic ground layer of cable 2C, which is terminated at one end by connecting device 200C; and the cable metallic ground layer of cable 1C, which is terminated at one end by connecting device 100C', is connected to the cable metallic ground layer of cable 2A, which is terminated at one end by connecting device 200A. Similarly, at a second junction box, the cable metallic ground layer of cable 2A, which is terminated at one end by connecting device 200A', is connected to the cable metallic ground layer of cable 3B, which is terminated at one end by connecting device 300B; the cable metallic ground layer of cable 2B, which is terminated at one end by connecting device 200B', is connected to the cable metallic ground layer of cable 3C, which is terminated at one end by connecting device 300C; and the cable metallic ground layer of cable 2C, which is terminated at one end by connecting device 200C', is connected to the cable metallic ground layer of cable 3A, which is terminated at one end by connecting device 300A.

As with splices, when cross bonding dead front terminals, it is preferable to have two sets of cross bonded terminals installed along the entire cable length in order to create 3 equal smaller lengths of cables that are required to complete the phase shift cancelling of the ground currents in the cable metallic ground layers along the entire length of cable. These two sets of terminals are installed to create 3 equal lengths of cable so that the magnitude of the ground currents created in each section are equal with allows for phase cancelling when the metallic ground layers of the cables are cross bonded.

Prior to the present invention, in applications such as wind farms, which require long distribution cable circuits, typically greater than 1,000 feet, splices were created in the cables for the purpose of cross bonding. It was not known to cross bond dead front terminals. Prior to the present invention, a significant impediment to cross bonding dead front terminals was the inability to electrically isolate the cable metallic ground (and cable insulation shield layer) from the outer semi-conductor layer of the connecting devices. At least one embodiment of the present invention solves that problem. By cross bonding the cables at the dead front terminals, as is done in the present invention, the need to create splices for cross bonding in long distribution cable circuits can be eliminated. Cross bonding the dead front terminals of the present invention is preferable over the previously used cross bonding splices because the connecting devices are above ground whereas the cable splices are below ground and are subject to moisture and mechanical damage. Furthermore, it is easier to locate and repair dead front terminals because they are above ground. An additional benefit of at least one embodiment of the present invention is that the connecting devices are separable and can serve as "test points" for very sensitive equipment to be utilized in the detection of the failed device(s).

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. An article suitable for cross bonding or shield isolation comprising:
 a first dead front terminal comprising:
  a first connecting device comprising a first housing having an outer semi-conductive layer and a first chamber defined by at least one wall wherein the outer semi-conductive layer comprises a portion of at least one wall of the first chamber,
  a first cable assembly having an exposed cable insulation shield layer and an exposed cable metallic ground layer, at least a portion of the first cable assembly positioned within the first chamber of the first connecting device,
  wherein the cable insulation shield layer and the cable metallic ground layer are electrically insulated and isolated from the outer semi-conductive layer of the connecting device, and
  wherein the cable metallic ground layer is electrically connected to a first external conductor.

2. The article of claim 1 wherein one or both of the cable insulation shield layer and the cable metallic ground layer is located in the first chamber of the connecting device housing.

3. The article of claim 1 wherein one or both of the cable insulation shield layer and the cable metallic ground layer is insulated and isolated from the outer semi-conductor layer of the connecting device by an insulating sleeve.

4. The article of claim 3 wherein the insulating sleeve is an elastomeric sleeve.

5. The article of claim 4 wherein the elastomeric sleeve is a cold shrink sleeve.

6. The article of claim 3 wherein the insulating sleeve comprises an elastomeric silicone.

7. The article of claim 1 wherein the first external conductor is electrically connected to a second external conductor that is electrically connected to a cable metallic ground layer of a second cable assembly, at least a portion of the second cable assembly being positioned within a first chamber of a second housing of a second connecting device of a second dead front terminal.

8. The article of claim 7 further comprising a third dead front terminal comprising a third connecting device and a third cable assembly at least a portion of which third cable assembly is positioned within a first chamber of a third housing of the third connecting device and a third external conductor electrically connected to a cable metallic ground layer of the third cable assembly and to a fourth external conductor that is electrically connected to a cable metallic ground layer of a fourth cable assembly, at least a portion of the fourth cable assembly being positioned within a first chamber of a fourth housing of a fourth connecting device of a fourth dead front terminal.

9. The article of claim 8 further comprising a fifth dead front terminal comprising a fifth connecting device and a fifth cable assembly at least a portion of which third cable assembly is positioned within a first chamber of a fifth housing of the fifth connecting device and a fifth external conductor electrically connected to a cable metallic ground layer of the fifth cable assembly and to a sixth external conductor that is electrically connected to a cable metallic ground layer of a sixth cable assembly, at least a portion of the sixth cable assembly being positioned within a first chamber of a sixth housing of a sixth connecting device of a sixth dead front terminal.

10. The article of claim 9 wherein the first and second cables of the first and second cable assemblies, respectively, are in different voltage phases of a three-phase power system, the third and fourth cables of the third and fourth cable assemblies, respectively, are in different voltage phases of a three-phase power system, and the fifth and sixth cables of the fifth and sixth cable assemblies, respectively, are in different voltage phases of a three-phase power system.

11. A system comprising:
  nine sections of cable, each having first and second ends,
  a first, a second, and a third cable section each having a second end comprising a cable assembly; a fourth, a fifth, and a sixth cable section each having first and second ends comprising a cable assembly; and a seventh, an eighth, and a ninth cable section each having a first end comprising a cable assembly;
  nine connecting devices each comprising a first housing having an outer semi-conductive layer and a first chamber defined by at least one wall wherein the outer semi-conductive layer comprises a portion of at least one wall of the first chamber;
  at least a portion of each cable assembly residing in a first chamber of a housing of a connecting device,
  each cable assembly having an exposed cable metallic ground layer, each cable metallic ground layer being electrically insulated and isolated from the outer semi-conductor layer of the connecting device;
  wherein the cable metallic ground layer on the second end of the first cable section is electrically connected to the cable metallic ground layer on the first end of the fourth cable section; the cable metallic ground layer on the second end of the second cable section is electrically connected to the cable metallic ground layer on the first end of the fifth cable section; the cable metallic ground layer on the second end of the third cable section is electrically connected to the cable metallic ground layer on the first end of the sixth cable section; the cable metallic ground layer on the second end of the fourth cable section is electrically connected to the cable metallic ground layer on the first end of the seventh cable section; the cable metallic ground layer on the second end of the fifth cable section is electrically connected to the cable metallic ground layer on the first end of the eighth cable section; the cable metallic ground layer on the second end of the sixth cable section is electrically connected to the cable metallic ground layer on the first end of the ninth cable section;
  wherein the first and fourth cable sections are in different voltage phases of a three-phase power system, the second and fifth cable sections are in different voltage phases of a three-phase power system, the third and sixth cable section are in different voltage phases of a three-phase power system; the first and seventh cable sections are in the same voltage phases of a three-phase power system; the second and eighth cable sections are in the same voltage phases of a three-phase power system; and the third and ninth cable sections are in the same voltage phases of a three-phase power system.

12. The system of claim 11 wherein the cable metallic ground layer is insulated from the outer semi-conductor layer of the connecting device by an insulating sleeve.

13. The system of claim 12 wherein the insulating sleeve is an elastomeric sleeve.

14. The system of claim 13 wherein the elastomeric sleeve is a cold shrink sleeve.

15. The system of claim 12 wherein the insulating sleeve comprises an elastomeric silicone.

16. The system of claim 11 wherein the first housing comprises an elastomeric silicone.

17. A kit for installing a dead front cable terminal suitable for cross bonding or shield isolation on a cable assembly having an exposed cable insulation shield layer and cable metallic ground layer, the kit comprising:
  a connecting device comprising a housing having an outer semi-conductive layer and a first chamber defined by at least one wall wherein the outer semi-conductive layer comprises a portion of at least one wall of the first chamber; and
  a device for electrically insulating and isolating one or both of the cable insulation shield and the cable metallic ground layer of the cable assembly from the outer semi-conductor layer of the connecting device.

18. The kit of claim 17 further comprising a conductor for connecting to the cable metallic ground layer of the cable assembly.

19. The kit of claim 17 wherein the device for electrically insulating one or both of the cable insulation shield and the cable metallic ground layer is an insulating sleeve.

20. The kit of claim 19 wherein one or both of the connecting device housing and the insulating sleeve comprise an elastomeric silicone.

* * * * *